(12) United States Patent
Ashili (10) Patent No.: US 9,924,028 B2
(45) Date of Patent: Mar. 20, 2018

(54) TAMPER RESISTANT SYSTEM FOR CREATING ZONES AND MANIPULATING COMPUTING DEVICES

(71) Applicant: Shashanka Ashili, Eagan, MN (US)

(72) Inventor: Shashanka Ashili, Eagan, MN (US)

( * ) Notice: Subject to any disclaimer, the term of this patent is extended or adjusted under 35 U.S.C. 154(b) by 0 days.

(21) Appl. No.: 15/524,125

(22) PCT Filed: Nov. 7, 2015

(86) PCT No.: PCT/US2015/059635
§ 371 (c)(1),
(2) Date: May 3, 2017

(87) PCT Pub. No.: WO2016/073967
PCT Pub. Date: May 12, 2016

(65) Prior Publication Data
US 2017/0339270 A1    Nov. 23, 2017

Related U.S. Application Data

(60) Provisional application No. 62/077,187, filed on Nov. 8, 2014, provisional application No. 62/109,100, filed on (Continued)

(51) Int. Cl.
*H04W 4/00* (2009.01)
*H04M 1/725* (2006.01)
(Continued)

(52) U.S. Cl.
CPC ...... *H04M 1/72577* (2013.01); *G06F 21/629* (2013.01); *G06F 21/86* (2013.01);
(Continued)

(58) Field of Classification Search
CPC ....... H04W 12/06; H04W 88/02; G08B 25/10
(Continued)

(56) References Cited

U.S. PATENT DOCUMENTS

2006/0019679 A1* 1/2006 Rappaport ............ G01S 5/0252
455/456.5
2012/0086549 A1* 4/2012 Barnes, Jr. ......... G06Q 10/1053
340/5.61
(Continued)

*Primary Examiner* — Kiet Doan
(74) *Attorney, Agent, or Firm* — Bagwell IP; Adam L. Bagwell (57) ABSTRACT

A system for selectively manipulating a mobile device when the mobile device is present within one or more defined zones within an area. The system comprises a control device transmitting a signal, with the signal having a decreasing signal strength as distance from the control device increases. The system additional comprises one or more profiles stored in a memory for determining the one or more defined zones based on one or more values, each value corresponding to a particular signal strength of the signal, and at least one software application executing on the mobile device. The application is configured for accessing the profiles from a memory and receiving, from the mobile device, an indication of the signal received at the mobile device and a signal strength of the received signal, and selectively manipulating the mobile device as a function of the signal strength and the one or more profiles.

7 Claims, 8 Drawing Sheets

Related U.S. Application Data on Jan. 29, 2015, provisional application No. 62/186,351, filed on Jun. 29, 2015.

(51) Int. Cl.
```
G06F 21/62      (2013.01)
G06F 21/86      (2013.01)
H04W 4/02       (2018.01)
H04W 4/04       (2009.01)
H04M 1/60       (2006.01)
```

(52) U.S. Cl.
CPC ............ *H04W 4/021* (2013.01); *H04W 4/046* (2013.01); *G06F 2221/2111* (2013.01); *H04M 1/6091* (2013.01); *H04M 1/72572* (2013.01)

(58) Field of Classification Search
USPC .... 455/435.2, 456.6, 456.1, 456.5, 436, 411, 455/415, 405; 370/318, 331, 328; 348/143

See application file for complete search history.

(56) References Cited

U.S. PATENT DOCUMENTS

| | | | | |
|---|---|---|---|---|
| 2015/0327012 | A1* | 11/2015 | Bian | H04W 52/0254 455/456.1 |
| 2016/0066157 | A1* | 3/2016 | Noorshams | G01C 21/206 455/457 |
| 2017/0019525 | A1* | 1/2017 | Hannon | H04M 1/72577 |

* cited by examiner

TAMPER RESISTANT SYSTEM FOR CREATING ZONES AND MANIPULATING COMPUTING DEVICES

CROSS-REFERENCE TO RELATED APPLICATION

This application claims the benefit of U.S. Provisional Application 62/077,187, filed Nov. 8, 2014.

TECHNICAL FIELD

The present disclosure relates generally to a system and devices for creating "safe" and "non-safe" zones within a vehicle and selectively manipulating mobile devices that are present within those zones.

BACKGROUND ART

Mobile device technology has provided many important tools for productivity in modern society. Unfortunately, this technology can create major distractions and create dangerous situations when used in certain environments, such as when a driver uses a device while driving a vehicle. While these dangers would seem to be apparent, drivers continue to interact with mobile devices while driving, putting themselves and those around them in serious danger. For example, a teenage driver may respond to a received text message while driving, thereby taking his attention off the roadway, resulting in injury or death to himself and/or innocent bystanders.

Current technologies that address this problem rely primarily on software applications to restrict functionality of the mobile device while a vehicle is in motion. Some software applications rely on the user to manually indicate when they have entered or exited the vehicle, i.e., the software application relies on an "honor system" that may or may not be accurate. In other examples, these software applications detect the motion of the car and disable the mobile device, either partially or fully. In these examples, the software applications may utilize GPS and accelerometer functionality of modern mobile devices. In such cases, these solutions cannot distinguish between the driver and passengers.

Some solutions use a combination of software and hardware devices in conjunction with the mobile device. These solutions typically utilize the vehicle's on-board diagnostic ("OBD") ports to detect the status of the vehicle and communicate various attributes of the vehicle to the software application executing on the mobile device, e.g., an "in-motion" status. Depending upon the communicated status of the vehicle, the software application may alter the functionality of the mobile device. For example, if the vehicle is moving, the software application may enable an "airplane" mode of the mobile device to prevent any wireless communication, such as sending or receiving text messages.

Other solutions utilize a non-OBD hardware device to define a "driver's side" zone and disable the mobile device when it is in the "driver's side" zone. These solutions suffer from significant problems, one of which being the solution's inability to identify between the driver's device and a passenger's device who is sitting behind the driver. As such, these solutions often end up disabling all the mobile devices that are on the "driver's side" including the backseat passenger on the driver's side. These solutions also suffer from an inability to extend the zones to cover other areas of the vehicle fully or partially, such as the passenger seats. For example, a hardware device may be placed on the windshield, where an application on mobile device might detect whether the mobile device is on right side or left side of the hardware device and disable the device when in the left side of the vehicle, i.e., the driver's side. However, in smaller cars, a driver may extend their hand to passenger side of the seat, crossing the invisible line created by device which is placed on windshield, and use the mobile device. Due to the shortcomings of the current solutions, these solutions meet with limited adoption, as they tend to disable unintended mobile devices beyond the driver's devices.

One of the prerequisite conditions for such systems is that they must remain in a known/installed position and moving the system from its "installed" position defeats the purpose of these systems, i.e., if a hardware device is installed on a dashboard and the system is configured based on that installed position, moving the hardware device to the trunk or outside of the vehicle defeats the purpose of the system. For example, when a hardware device is used to identify the position of the cell phone (driver/passenger seat), the teenage/novice driver may tend to move the hardware device to fool the system, thereby defeating the purpose of the system. Current systems generally suffer from an inability to detect the relocation of sensors.

Brown, U.S. Pat. No. 6,690,940 discloses a system for restricting a mobile device based on the device's presence in a predefined area. The area may be indicated by a pressure switch in vehicle seats or may comprise a 3-D volume of space. The system may use GPS coordinates of the device to determine if the device is within a certain distance of a certain object, or the system may transmits a signal and if the device receives it, the device is disabled. In other word, the "predetermined area" is merely the range of the signal, i.e., signal strength is not used to define areas or determine the relative location of the device.

Guba, U.S. Patent Pub. No. 2011/0009107, discloses a system of disabling a mobile device based on the speed of the vehicles the device is in. The device ("receiver") receives a signal indicating the speed of the vehicle from a transmitter in the vehicle and the receiver enables/disables accordingly. The invention merely describes using Bluetooth as the transmission protocol, but does not use the signal strength for any particular purpose. This invention does not rely on predefined zones, but treats any receiver than receives the signal as being controllable based on the speed of the vehicle. In other words, this invention cannot determine a spatial position of a given device only that it is "in range". Other systems, such as U.S. Pat. No. 8,761,821, restrict device functionality by determining the position of the CMD within a "restricted zone" based on triangulating its position based on signals transmitted BY the device, e.g., the strength of its cell signal received at cell towers. In other words, the device position is based on its transmitted signals, rather than signals received by device. As such, this system cannot detect changed sensor placement.

SUMMARY OF THE INVENTION

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below. It also provides a use case where such invention can be utilized, for example distracted driving.

Aspects of the present invention relate to system for selectively manipulating at least one mobile device when the mobile device is present within one or more defined zones within an area, said system comprising a first control device, said first control device transmitting a first signal, said first signal having a decreasing signal strength as distance from the first control device increases. The system may additional comprise one or more profiles stored in a memory, said profiles determining the one or more defined zones based on one or more values, each value corresponding to a particular signal strength of said first signal, and at least one software application executing on the mobile device, said application being configured for accessing said one or more profiles from said memory and receiving, from the mobile device, an indication of said first signal received at the mobile device and a first signal strength of the received first signal, said first control device, and selectively manipulating the mobile device as a function of the first signal strength and said one or more profiles.

Aspects of the present invention relate to manipulating computing devices when those devices are present within certain areas of a vehicle, such as the driver's seats. For example, aspects of the present invention may include utilizing one or more hardware devices (also referred to as one or more control devices) that is capable of providing proximity information among other parameters (information from temperature, accelerometer and other sensors) to define one or more zones within and around the vehicle, as well as a software application executing on the computing device that, among other things, monitors for predefined zones and selectively initiates actions when in predefined zones, such as but not limited to, enabling/disabling wireless communications, enable wireless communications for certain functionality while disabling wireless communications for other functionality, and/or enable certain applications while disabling others. For example, the software application may permit the driver's device to utilizing a mapping application that requires data received via wireless communication, while disabling text messaging applications or otherwise preventing those applications from sending and receiving data via wireless communication. As a result, aspects of the present invention advantageously decrease driver distraction while the driver remains in the driver's seat.

Aspects of the present invention also related to identifying whether the hardware device is moved from the present or installed location. For example, if it is installed on the driver's side of a vehicle by the parent, we would like to make sure it stays there and cannot be moved to anywhere else without notification to the parent or administrator. For example, aspects of the present invention may include utilizing one or more hardware devices to define zones within and around the vehicle, as well as a software application executing on the computing device that, among other things, monitors for predefined zones and tampering (physical movement of hardware device), and selectively initiates actions when in predefined zones, such as but not limited to, enabling/disabling wireless communications, enabling wireless communications for certain functionality while disabling wireless communications for other functionality, and/or enabling certain applications while disabling others. For example, the software application may permit a driver's mobile device to utilize a map application that requires data received via wireless communication, while disabling text messaging applications or otherwise preventing those applications from sending and receiving data via wireless communication. For example, in the case of moving of hardware devices from one location to another (either in the vehicle or outside of the vehicle), the software and/or the hardware device individually or together might generate a signal to indicate to the owner (parent) that hardware has been moved (location tampered). This indication may be in the form of email, text, phone call or some combination thereof. As a result, aspects of the present invention advantageously decrease driver distraction with minimal hardware while the driver remains in the driver's seat.

According to aspects of the present invention, the placement of one or more hardware devices within a vehicle permits the designation of one or more "zones" within the vehicle, as each zone can be determined based on, among other things. For example, a "non-safe" zone may be defined as a space where certain functions create driver distractions, e.g., a space including the driver's seat. A "safe" zone is a space outside the "non-safe" zone, which may be explicitly defined as including certain areas in and around the vehicle, or implicitly defined as any area which is not the "non-safe" zone, or some combination thereof. The boundary between the "safe" zone(s) and "non-safe" zone(s) may be determined by the unique combination of signal strengths at that particular spatial point. Once the one or more zones are defined, a software application on the mobile device determines whether the mobile device is positioned within a "safe" or "non-safe" zone based on the information received from the hardware devices. In case of a single hardware device, the signal from the device is used to define the "safe" and "non-safe" zone(s). In some embodiments, these zones may also be defined during the installation or pre-loaded based on parameters such as the car manufacturer, model, year, etc.

According to aspects of present invention, the zones may be pre-loaded or created by the administrator or parent. In case of multiple hardware devices, the administrator may "train" the system during installation. For example, an exemplary training procedure may include, among other things, moving a mobile device across the circumference of the desired/required zone (e.g., a driver's seat) and recording the signal values at various points. These recording signal values (which may generally correspond to one or more signal strengths from one or more hardware devices) may generally define a zone boundary. Since each hardware device generates an RF field within the vehicle, the zones may be selectively reconfigured to include just a driver's seat, a driver's seat and part of a front passenger seat, the whole car or any combination thereof and designate them as non-safe zone. In some embodiments, these zone configuration options may be configured/performed as part of one or more software applications on the mobile device. Such a reconfigurable zoning eliminates the way of defeating the system by moving the hand to passenger seat to text or call while driving. According to aspects of the present invention, the safe and non-safe zones may be changed dynamically by the administrator without removing the hardware device from an initial installed location. In instances of a single hardware device, these zones can be created automatically by the software application based on, for example, the make, model, and year of the car into which the system is being installed. Since the distance between the seats is usually known (or may be calculated or inferred from the car information) for a given car, the zones ("safe" and "non-safe") may be calculated and provided to or otherwise made accessible to the software application by the manufacturer or any other suitable party.

According to aspects of present invention, one or more software applications may be installed on the mobile device. The application may, for example, communicate with the hardware device through Bluetooth or other wireless protocols. The application may have administrator access over the mobile phone. It may also communicate with system backend (described below), e.g., a cloud-based service, database, computing power, etc., through one or more wireless communications protocols or mechanisms via a mobile device, e.g., a WiFi or 3G/4G/LTE data connection. The application may also monitor settings or configurable parameters associated with the hardware device and compare the monitored settings/parameters against the initial settings or parameters that were configured as part of system installation. In conjunction or standalone, the application can raise the tamper alarm in the form of sound or text, call, email or some combination thereof to the parent or administrator.

According to aspects of the present invention, these hardware devices may be placed in a housing that may displace or disconnect the power source, such as a battery, from the device through electrical means, mechanical means or other mechanism if the device is physically moved after first installation. Such loss of power event may be utilized to generate a change in the parameters of the device. These parameters may include, but are not limited to, identification, on-board memory contents, flags or some combination thereof. A power loss event may also set some or all parameters to default factory settings of the device. In other words, such a change in parameters results in modifying the parameters that were configured at the time of installation by the parent or administrator. Such changes may be indicative of tampering and may be utilized to alert, notify, or otherwise inform a parent or administrator of the changes.

According to aspects of the present invention, the system further comprises a software application executing on a computing device such as mobile device, a backend platform that acts as a remote storage and/or remote computing platform to, among other things, create safe and non-safe zones and selectively control the computing device (e.g., disabling in whole or in part pre-determined functions such as calling, texting, social media, etc.) in non-safe zone and enabling them in safe zone to reduce distractions within the defined zones.

According to aspects of the present invention, the hardware device may also have one or more sensors such as, but not limited to, an accelerometer, a gyroscope, a magnetometer, a thermometer, a proximity sensor, an alcohol detection sensor, or other sensors to detect environmental parameters such as gases (e.g., oxygen, carbon monoxide, etc.) etc. These hardware devices may be powered via batteries, an OBD port, a cigarette lighter port, etc. These hardware devices may also be installed during the car manufacturing process. In some embodiments, circuit breakers such as micro-switches may be utilized to disconnect the power supply to the device. Such breakers may be part of the hardware device printed circuit board itself or may be located as independent device as part of housing. According the aspects of the present invention, the hardware device may also include a computing processor for, among other things, processing data related to the device(s), sensor(s), system status, memory storage, and/or transmitting data as appropriate. The hardware device may additionally include one or more internal or external antennas, or some combination thereof, for transmitting and or receiving the data. The data may include, among other things, system settings and/or data received from sensors. In some embodiments, the transmitted data, e.g., an output signal or packet contents, may be utilized to identify the corresponding system and the on-board sensor information.

Aspects of the invention may further include a "smart" transponder application executing on a mobile device that may include, among other things, functionality for interfacing or otherwise communicating data via a network communication channel, e.g., via the Internet utilizing wifi, Bluetooth, etc. The transponder may additionally include a computer-readable memory having stored thereon instructions for determining a position of the mobile device, identifying hardware device, and saving zone configuration information, and one or more computer processors for executing the instructions. The transponder may communicate data received from the hardware device to a remote location, such as a back-end server or cloud storage, or may store the data to memory local to the mobile device, or some combination thereof.

BRIEF DESCRIPTION OF DRAWINGS

For a better understanding of the disclosure, and to show by way of example how the same may be carried into effect, reference is now made to the detailed description along with the accompanying figures in which corresponding numerals in the different figures refer to corresponding parts and in which the drawings show several exemplary embodiments.

DETAILED DESCRIPTION OF THE INVENTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

As noted above, the use of mobile phones while driving creates driver distraction and may be dangerous to the driver and those around him. Aspects of the present invention provide a system whereby a single or multiple hardware devices can be utilized to selectively disable, either partially or fully, when the mobile device is positioned within a "non-safe" zone while the car is being driven. According to aspects of the present invention, the system includes one or more hardware devices strategically placed inside the vehicle. A hardware device may transmit pre-loaded/pre-defined details such as its identity, data on board (e.g., temperature, magnetometer, accelerometer, etc.), an initial signal strength, etc. By way of example and not limitation, the hardware transmitters may utilize Bluetooth, wifi, or any other suitable wireless communication method whereby signal strength diminishes as a function of distance between the device/transmitter and mobile phone/receiver.

Figure 1:
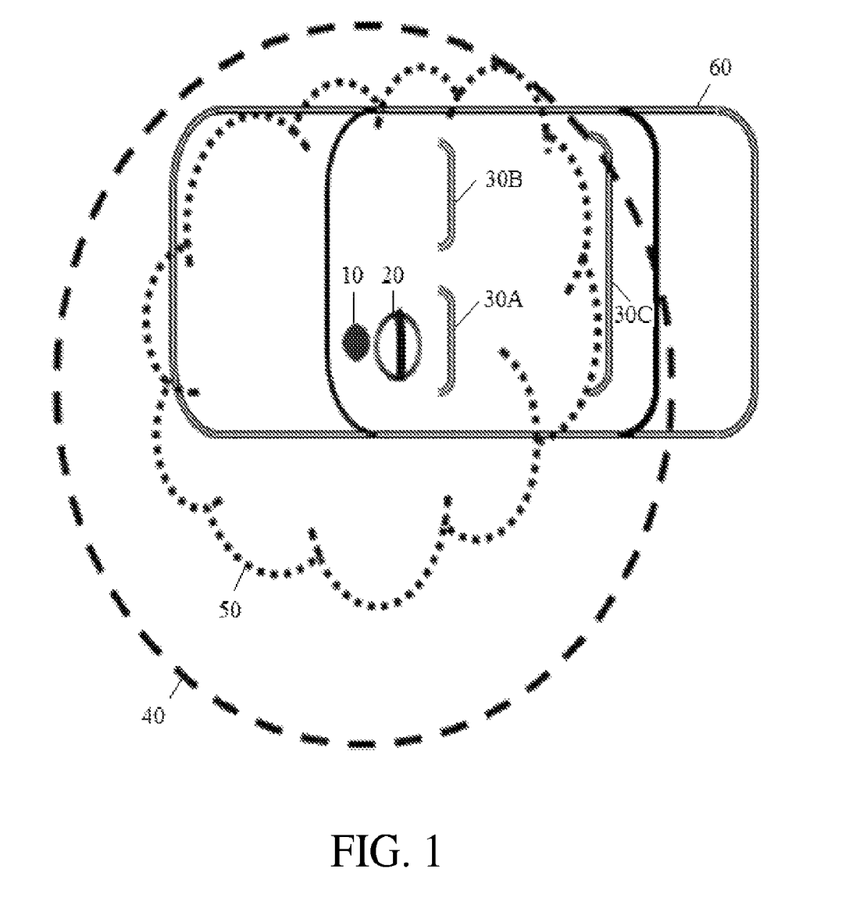
FIG. 1 illustrates an exemplary diagram of an embodiment of the present invention including reconfigurable zones, according to various aspects described herein.

According to aspects of the present invention, as demonstrated by the example shown in FIG. 1, one or more hardware devices 10 with capability of providing proximity information may be utilized to define zones within and around the vehicle 60, e.g., "safe" and "non-safe" zones for mobile device 20 user. These hardware devices 10 may emit radio frequencies for communicating with the software application executing on the mobile device 20. In this context, hardware device(s) 10 may comprise a device that may include, but is not limited to, one or more sensors, one or more transmitters, one or more receivers, one or more computer processors, one or more memory, battery, etc., whereby the hardware device may provide, but is not limited to, proximity information, localized temperature, and other sensor information, as well as store, calculate, transmit, receive, or otherwise process information and commands via one or more communication channel. According to aspects of the present invention, the emitted radio frequencies strength diminish as the distance from the hardware device 10 increases. At any given spatial point within the automobile, the received signal strength by the mobile device 20 from one or more hardware devices 10 will therefore vary based on the distance between the mobile device 20 and each hardware device 20. The received signal strength from the one or more hardware devices 10 may then be used to approximately determine the spatial location of the mobile device 20 within the vehicle 60, an example of which is described below with respect to FIGS. 3 and 4.

According to aspects of the present invention, the zones may be redefined "on-the fly", without removing the hardware device 20 from its location. For example, the distance between the two seats 30A and 30B in the front row may vary for different cars. In other words, in some vehicles, a driver may extend their hand and mobile device 20 towards the passenger seat and gains access to mobile device functionality once the mobile device moves out of a "non-safe" zone. In order to avoid such situations, a hardware device 10 has the capability to extend the zone, either automatically or by action of the administrator, without replacing or remounting the hardware device 10.

According to aspects of the present invention, the placement of the one or more hardware devices 10 within a vehicle 60 permits the designation of one or more "zones" within the vehicle, as each zone can be determined based on, among other things, received signal strength. For example, a "non-safe" zone may be defined as a space where certain functions create driver distractions, e.g., a space including the driver's seat. A "safe" zone is a space outside the "non-safe" zone, which may be explicitly defined as including certain areas in and around the vehicle, or implicitly defined as any area which is not the "non-safe" zone, or some combination thereof. The boundary between the "safe" zone(s) and "non-safe" zone(s) is determined by the unique combination of signal strengths at that particular spatial point (described below with respect to FIG. 4). Once the one or more zones are defined, the software application on the mobile device 20 may determine whether the mobile device 20 is positioned within a "safe" or "non-safe" zone based on the signal(s) received from the hardware devices.

As shown in FIG. 1, circle 40 represents the ideal or theoretical zone, while circle 50 represents the practical or actual zone. Due to the attenuation from various objects within the vehicle, such as seats, metals, etc., in the car, the actual zone may approximate a circle (e.g., circle 40) or may be a non-uniform "cloud" shape (e.g., circle 50). As shown in FIG. 1, the non-safe zone may selectively cover the driver seat 30A and passenger seat 30B, or partially or fully cover the passenger seat including driver seat (not shown) or may cover the whole car 60 (not shown). By way of example and not limitation, such zoning may be accessed through the software application installed on the mobile device 20 using a profile-based mechanism to create a non-safe zone. The profiles may be generated by utilizing the parameters such as make, model, year to calculate the distance between the seats and categorizing them through various profiles such as driver only, driver and extension where it covers part of passenger seat, front only and the whole car or any combination thereof. Such profiles may be changed on the fly by the administrator.

The hardware device 20 may be installed in the vehicle with defined zones. For example, the user/administrator may indicate or otherwise provide information, such as the make and model of the vehicle 60 into which the system is being installed. Based on this information, the system may compute or otherwise determine one or more spatial distances within the vehicle 60, such as but not limited to, the distance between the driver seat 30A and the passenger seats 30B and 30C. A smart transponder, such as an application executing on the mobile device 20, may then define or otherwise determine one or more zones within the vehicle 60, e.g., a "safe" zone and a "non-safe" zone. Whenever the mobile device 20 comes into the zone, "smart transponder" functionality of the application recognizes the hardware device 10 and activates capabilities/functionality of the smart transponder and/or mobile device 20, e.g., connecting to a remote, back-end server (e.g., element 60 in FIG. 2. In case of alerts, the back-end system communicates alerts (text messaging, SMS/MMS messaging, email, etc.) to the parents, administrators, etc., based on information received from the smart transponder, via one or more appropriate communication channels (e.g., BlueTooth, WiFi, LTE, etc.).

Figure 2:
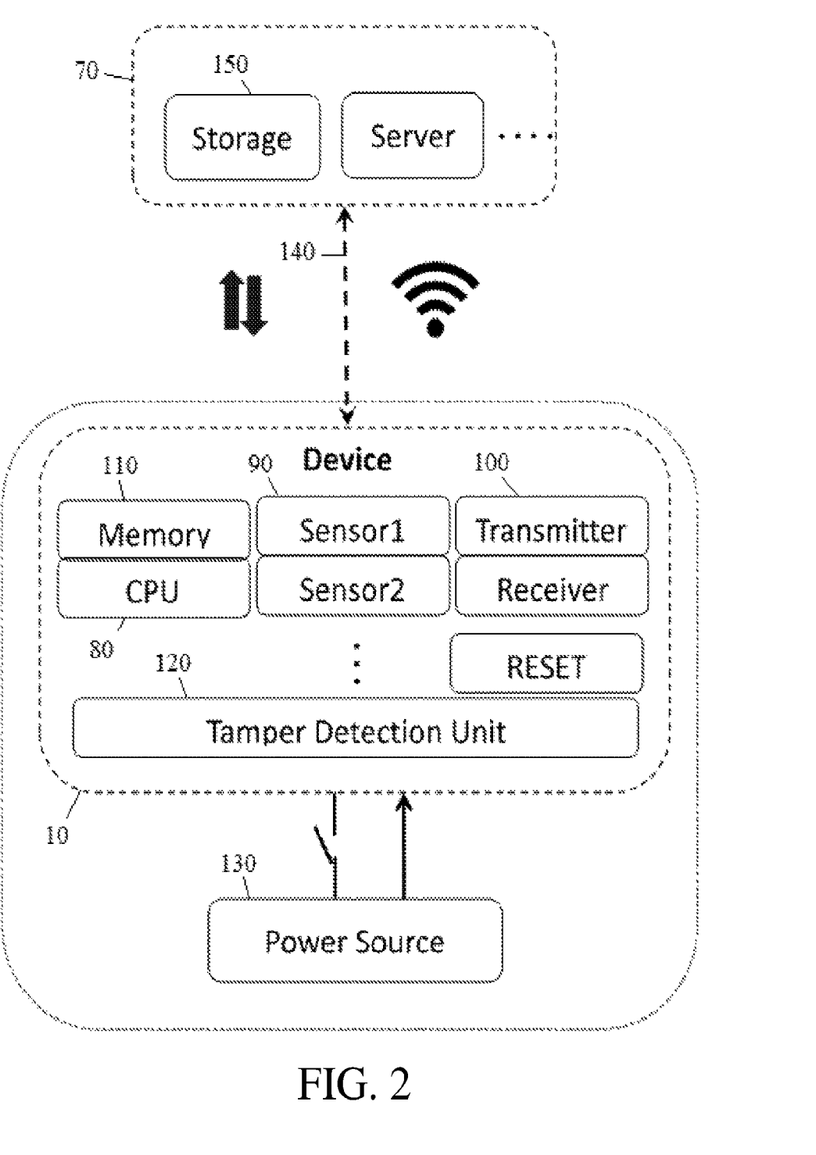
FIG. 2 illustrates an exemplary functional system diagram of a hardware device, according to various aspects as described herein.

FIG. 2 shows an exemplary functional diagram of an embodiment of the present invention. The hardware device 10 generally consists of a CPU 80 which computes and monitors various activities, number of sensors 90 for monitoring various activities, a communication module 100 for transmitting data via BlueTooth, wifi, LTE, etc., and a memory module 110. A tamper detection unit 120 incorporating various mechanisms as noted throughout may be incorporated internally or externally to the hardware device 10. A power source 130, such as a battery, may also be part of the device, either internally or externally. The mobile device 20 communicates with a back-end server(s) 70 (or cloud) through one or more appropriate communication channels 140, such as wifi, LTE, etc., and communicates with hardware device through wifi or Bluetooth. In some embodiments, the remote storage may be a memory associated with the mobile device 20, or a storage device 150 associated with a back-end server(s) (or cloud). In some embodiments, the memory module 110 stores details such as, but not limited to, the identifier of the device, transmission frequency, transmission power, etc. In some embodiments, to the memory 110 may store firmware for the hardware device 10, which may include settings for a default mode of the hardware device 10.

Figure 3:
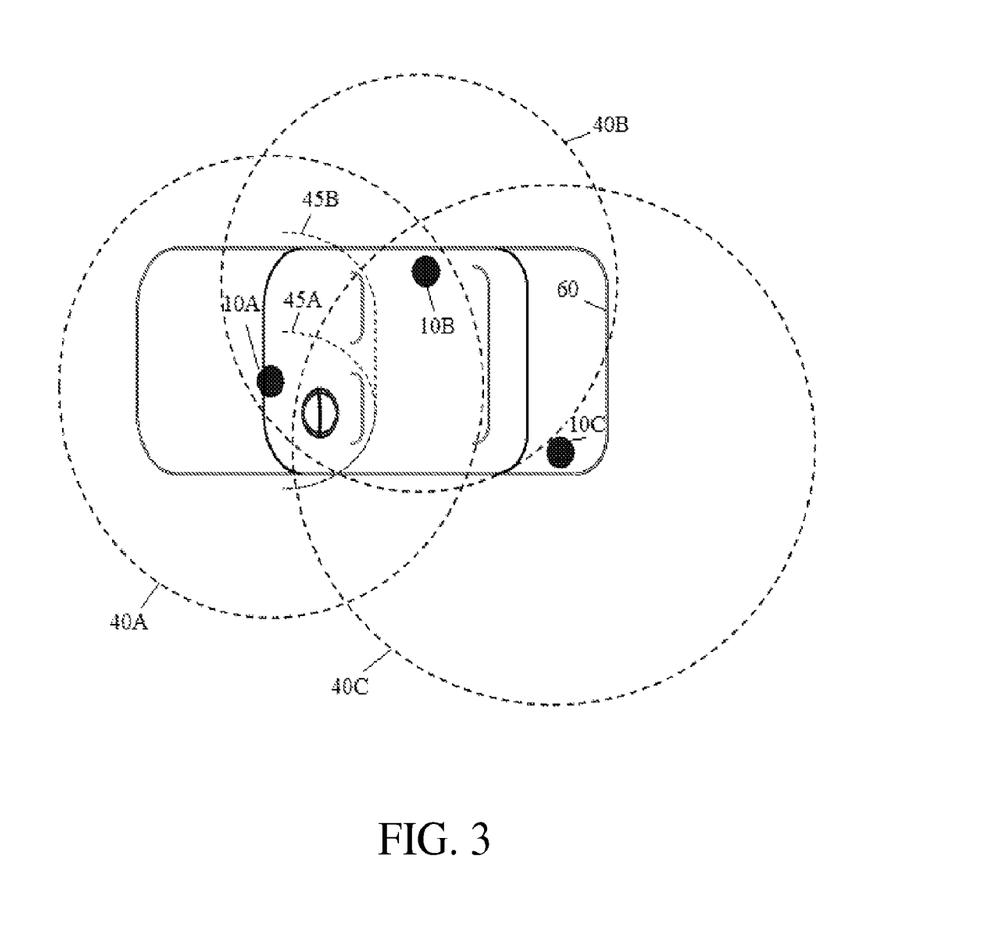
FIG. 3 illustrates multiple exemplary devices that may be utilized to create zones within an exemplary vehicle, according to various aspects as described herein.
Figure 4:
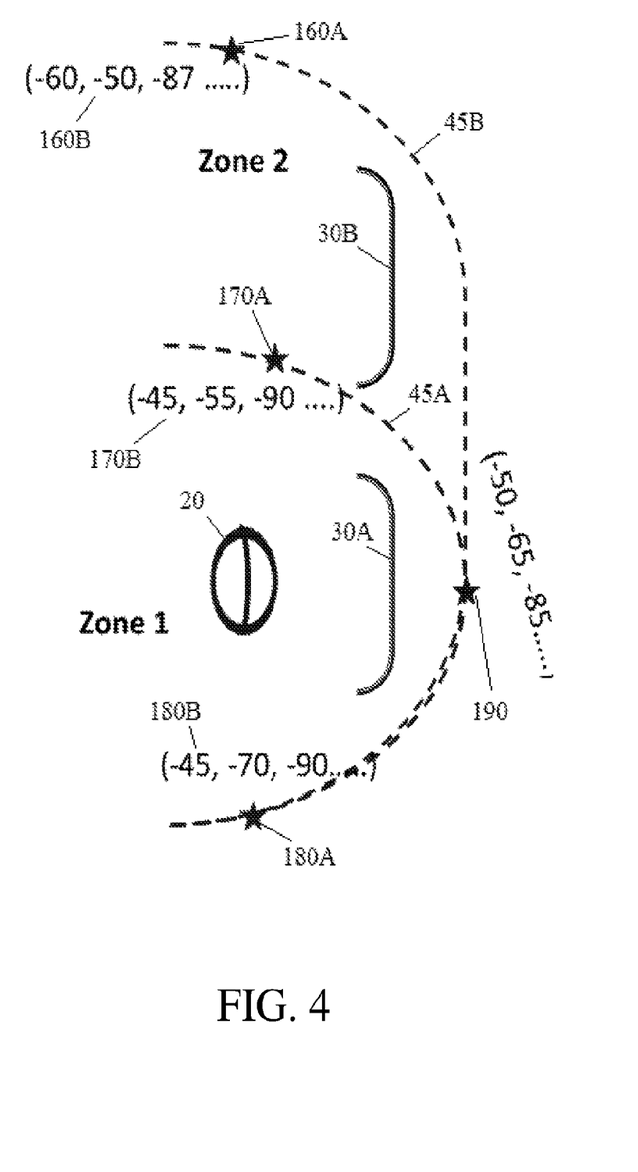
FIG. 4 illustrates exemplary sensor values received at a mobile device at three exemplary spatial locations/positions, according to various aspects described herein.

FIG. 3 illustrates an exemplary system comprising multiple hardware devices 10A, 10B, 10C to create, among other things, zones within the car. The multiple hardware devices may also be utilized to detect spatial tampering (e.g., moving the device from one location to another). As noted above, each hardware device emits an RF field that decreases in strength as the distance from the device increases. The three exemplary hardware devices 10A, 10B, 10C and their range of their emitted RF field (not to scale) are represented by circles 40A, 40B, and 40C, respectively. In general, the range of these hardware devices may extend significantly outside the confines of the vehicle. For simplicity, the ranges are shown in FIG. 4 within the vicinity of the vehicle. This overlapping of signal field maps the space inside the car in such a way that each spatial point experiences a different combination of signal strengths when measured by receiver (e.g., mobile device 20). Such combination of strengths cannot be experienced at any other point in space. By way of example and not limitation, the unique combination of these strengths may denote a unique position within the vehicle, as described below, and may also be utilized to detect spatial tampering. The hardware devices 40A, 40B, and 40C may utilize one or more directional antennas or an omni-directional antenna as shown. In case of an omni-directional antenna, the field is generally uniformly spread in all the directions as shown, subject to attenuation from the vehicle frame, seats, etc., which may "deform" the field.

FIG. 4 illustrates exemplary signal strengths received, at a mobile device 20, from three different hardware devices 40A, 40B, and 40C, located at various points within the car. As illustrated in FIG. 4, each point in space is defined by a series or array of numbers reflecting the signal strength of the received signals at that point. For example, if mobile device 20 were placed at the point shown by 160A, the device 20 may receive a combination of signals having strengths of (−60, −50, −87). Other exemplary locations and corresponding signal strengths are illustrated by 170A, 170B, 180A, and 190B. However, any number of hardware devices may be utilized, each with a corresponding signal strength value in the series/array. This combination of strengths at any point in space is unique within the vehicle, thus mapping all points with unique combinations. Such a valid combination of strengths may be provided to the system by the administration via an installation/training mode performed at the time of installation. When a single hardware device or multiple hardware devices are relocated or removed, such combination of strengths will be altered or otherwise disturbed. According to aspects of the present invention, a "trained" system that was trained to detect the original combinations may now see signal strength combinations in different combinations. For example, the mobile device may receive one or more signal strengths that are "out-of-range" when compared with the other signal strengths at a given spatial location. In other words, a trained system will have a certain set of valid signal strength combinations based on the placement of the hardware devices. If a combination of signal strengths is received that falls outside the set of valid combinations, the "out-of-range" values may tend to indicate hardware device spatial tampering.

According to the aspects of the present invention, the software application executing on the mobile device 20 includes functionality to detect if any functions of the mobile device 20 needs to be disabled or enabled. By way of demonstration and not limitation, the functionality may include, but is not limited to, identifying if the vehicle is moving, identifying if the mobile device is in driver zone, safe zone, non-safe zone, etc. Disabling functions of the mobile device 20 may include, but is not limited to, masking the intended or relevant functions, disabling the intended or relevant functionality, or otherwise modifying functions of the mobile device to control its usage.

Generally speaking, the software application runs in the background on the mobile device 20 to monitor for zone entry/exit events or speed configurations (for example, exceeding a certain threshold speed or car movement detection), and thereafter transitions into the foreground to control the operations of the mobile device 20. For those mobile device operating systems that do not permit "background" applications or may prevent those applications from executing in the background, i.e., suspended, the software application executes in the manner required by the mobile device operating system to accept data or otherwise monitor for events. In some cases, where the operating system or user does not permit the software application to come into the foreground, the application may still selectively enable and disable features of the mobile device based on the zone configuration information. In some cases, the software application may chose not to come into foreground, but may still selectively enable and disable features of the mobile device based on zone configuration information.

In some embodiments, information such as contact details of one or more administrators and/or the users, hardware settings, software settings, etc., or some combination thereof, may be stored locally, remotely, or both. Other information, such as GPS data/coordinates and/or other data from sensors on the mobile device 20 may be communicated and stored remotely or stored locally on the device. The locally-stored data may then be communicated, in whole or in part, for remote processing and/or storage.

According to aspects of present invention, data received at the mobile device may be utilized to analyze or otherwise determine previous spatial positions of the mobile device 20. A "previous positional analysis" or the like may be utilized to understand the movement of the mobile device 20 within the vehicle 60. Such information may then be utilized by sophisticated algorithms that, together with the signal strength or other pertinent information, may model or map historical locations of the mobile device 20. This positional information may also be utilized by non-traditional anti-tampering schemes to determine, for example, that a hardware device 10 may have been covered with a metallic foil in order to deflate or otherwise obscure the signal strength or a mobile device 20 may have been temporarily moved out of the non-safe zone (e.g., when the user of the mobile device 20 attempts to text or call) and then returned to the non-safe zone.

According to aspects of the present invention, the software application stores data related to the configuration and execution of the application, such as but not limited to the definition of zones, unique IDs of hardware device(s), the spatial point of users' mobile devices at given points in time, and environmental data such as acceleration, temperature, etc., in local memory, in a local data structure(s), in local data store(s), in remote locations such as cloud storage or a database, or some combination thereof. By way of demonstration and not limitation, this data may be used to generate or update driving profiles to assess driving patterns/behavior of the mobile device user, or may be used to trigger alerts such as the presence of a mobile device 20 in a vehicle with a temperature over a pre-defined threshold. The software may store and/or access the data via one or more wireless communication channels, e.g., LTE, 4G, wifi, etc., one or more wired communications channels, or some combination thereof. These driving profiles may include information about braking (often, hard, etc), number of turns, severity of turns, speed, acceleration etc. In some embodiments, driving profiles may be combined with local traffic rules, laws, ordinances, etc., to, among other things, determine a driver's compliance with the rules/laws/ordinances. By way of demonstration not by limitation, the profiles may also be generated by collecting data from built-in sensors (gyroscope, accelerometer, magnetometer etc) within the mobile device 20.

According to aspects of the present invention, the software application may execute on a user's mobile device 20 in a non-administrative mode and determines the spatial position of the mobile device 20. It should be understood that the administrative and non-administrative functions of the invention may be embodied in a single software application or may be embodied in a plurality of software applications without departing from the scope of the present invention. The strength of the signal received from a hardware device 10 is proportional to the distance between the receiver, e.g., the mobile device, and the hardware device 10. At any spatial point within the vehicle, the strength of the signal received by the mobile device 20 from the hardware device is different. It should to be noted, however, that the spatial point estimated by the received signal strength may be limited in resolution. For example, if the system includes one hardware device, the software application determines the mobile device's location, i.e., spatial point, by receiving a signal from the hardware device 10 and evaluating the strength of the received signal to determine mobile device 20 location with respect to the hardware device, e.g., a particular distance from the hardware device 10 or a particular spatial point in zones.

The signal may additionally encode a unique ID of the hardware device, as well as data from sensors such as thermometers, accelerometers, gyroscopes, magnetometers, inertial measurement units, and/or any other sensing device(s). This data may also be provided by or otherwise obtained from one or more sensors of the mobile device, e.g., GPS information. By way of demonstration and not limitation, if the system utilizes the Bluetooth communication protocol, the device's location with respect to the hardware device 10 may be determined based on known signal strength properties such as signal strength reduction as a function of distance. For example, a device's spatial point may be determined by comparing the initial strength of signal when broadcast with known distance to the strength of the signal when received Once the driver's "not safe" zone is defined, every time the mobile device 20 comes into the zone, the software application selectively controls mobile device 20 functionality to minimize driver distractions. In other words, the software application may selectively control mobile device 20 functionality based on the device's position and the defined zones. For example, the software application may disable call and texting functionality, but continue to allow access to mapping applications.

According to aspects of the present invention, the system may also include a software application for execution on an administrator's mobile device (not shown), where the software application receives communication from the hardware device 10 and enables the administrator to install the system within a vehicle and define zones within and around the vehicle based on the received communication. For example, the user may be presented with an administrative user interface ("UI") with a diagram, whereby the user may define driver and passenger zones within and around the vehicle. In some embodiments, the administrator may then lock or otherwise secure the parameters of the installed system to prevent non-administrator users from altering, changing, and/or deleting zones. For example, the administrator may be a parent, while other non-administrative users may be children and/or other occupants of the vehicle.

According to aspects of the present invention, the software application executes on a user's mobile device 20 in a non-administrative mode and determines the spatial position of the mobile device. It should be understood that the administrative and non-administrative functions of the invention may be embodied in a single software application or may be embodied in a plurality of software applications without departing from the scope of the present invention. The strength of the signal received from a hardware device 10 is proportional to the distance between the receiver, e.g., the mobile device, and the hardware device. At any spatial point within the vehicle, the strength of the signal received by the mobile device 20 from the hardware device 10 is different. It should be noted, however, that the spatial point estimated by the received signal strength may be limited in resolution.

Figure 5:
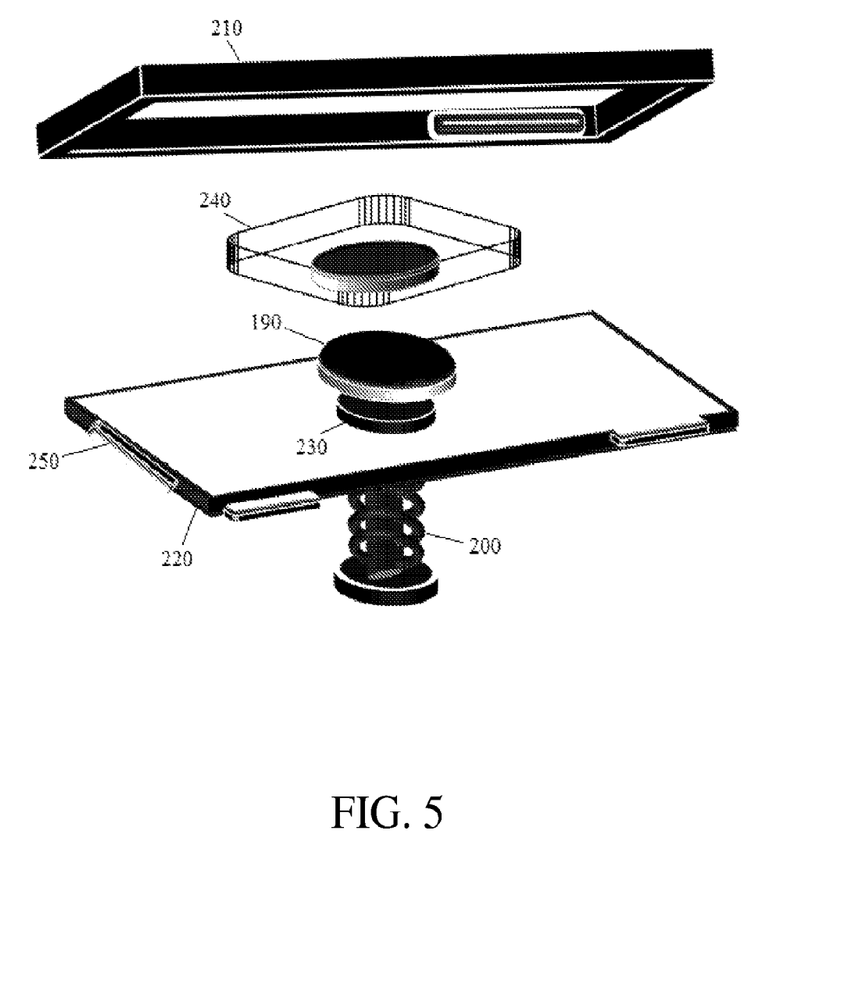
FIG. 5 illustrates an exemplary diagram of a system and method for detecting tampering by displacing the battery, according to various aspects described herein.

For example, if the system includes one hardware device 10, the software application determines the mobile device 20 location, i.e., spatial point, by receiving a signal from the hardware device 10 and evaluating the strength of the received signal to determine mobile device 20 location with respect to the hardware device, e.g., a particular distance from the hardware device 10 or a particular spatial point in zones. The signal may additionally encode a unique ID of the transmitter, as well as data from a thermometer, accelerometer, gyroscope, magnetometer, inertial measurement unit, and/or any other suitable data transmitter(s). This data may also be provided by or otherwise obtained from one or more sensors of the mobile device, e.g., GPS information. By way of demonstration and not limitation, if the system utilizes the Bluetooth communication protocol, the mobile device's location with respect to the hardware device 10 may be determined based on known signal strength properties of the protocol, such as signal strength reduction as a function of distance. For example, a mobile device's spatial point may be determined by comparing the initial strength of signal when broadcast to the strength of the signal when received and calculating a distance based on the type of communication used. Once the driver's "not safe" zone is defined, every time the mobile device 20 comes into the zone, the software application selectively controls mobile device 20 functionality to minimize driver distractions. In other words, the software application may selectively control mobile device 20 functionality based on the mobile device's position and the defined zones. For example, the software application may disable call and texting functionality, but continue to allow access to mapping applications According to aspects of the present invention, each of the one or more hardware devices 10 may selectively communicate their respective status to the software application executing on the mobile device 20, such as but not limited to, identity, signal strength, temperature, and acceleration, or some combination thereof. The signals received from either a single hardware device or multiple hardware devices may be used to define the spatial zones. This status information from devices may be utilized to, among other things, identify proximity device tampering. For example, in case of multiple hardware devices, once installed and configured with zone and other parameters, the space within the vehicle 60 is mapped by the signal strengths from these hardware devices (e.g., devices 10A, 10B, and 10C). Since the signal strength decreases as the distance from the device increases, each point in space will have unique combination of signal strengths from the multiple hardware devices. In case of physical movement of one or more of the hardware devices, this combination will be disturbed. Such a disturbance event may be utilized to raise a tamper alert, as noted above According to aspects of the present invention, the hardware device 10 is installed in one location should not be moved to other location without the raising an alarm or notification. In some embodiments, the hardware device 10 is placed in a packing where a battery is displaced or disconnected whenever a moving event occurs. For example, a battery 190 may be placed on a spring loaded spindle 200 by using a double-sided tape or glue (not shown), as shown in FIG. 5. When a top cover 210 of the housing of the device is pressed onto a base 220 of the housing with a spring-loaded spindle 200, the top 210 locks itself onto the bottom base 220 using an interlocking mechanism, which seats the battery into the base. When this "closed" hardware device 10 is installed, the back spindle 230 (protruding from the base bottom) will be pushed up, resulting in the battery 190 making contact with terminals (or other suitable connection/connector) 240 of the hardware device 10. In some embodiments, the bottom base 220 may have glue or screws to fit on an installation surface. When removed from the location after installation, the spring action causes the battery to "pull back", resulting in the disconnection of the battery 190 from the terminals.

According to aspects of the present invention, the sides of the base plate 220 may accommodate grooves 250 that enables a locking mechanism when pressed together with the top cover 210. According to aspects of the present invention, the top plate 210 may incorporate an interlocking mechanism or slots corresponding to grooves 250, as demonstrated in FIG. 5. These slots, together with base plate grooves, advantageously provide a locking mechanism for the hardware device 10 housing In some embodiments, a bottom surface (not shown) of the base plate 220 may have a glue or double-sided tape for holding the hardware device 10 to the installation surface while the hardware device 10 is being installed. In some embodiments, this fixation may also be accomplish using screws or other appropriate fastening or securing mechanism.

Additionally, pressure sensors or contact sensors or a reset button (micro-switch) may be mounted throughout or at specified locations on the outer surface of a hardware device 10 (not shown) in order to actively monitor the hardware device 10. These sensors are activated when the device is removed or an attempt is made to remove the hardware device 10. Such an activation may disconnect the power source permanently or temporarily to the device, as described above. Additionally, such an event may be stored in the hardware device 10 memory. In either case, when the mobile device 20 comes into vicinity, the software application may read such an incident or change in parameters due to the loss of power and report the information/event to the administrator. In some instances, such switches may be used to reset the memory contents of the hardware device 10 including the identifiers to some default values which are different from the values at the time of installation. According to aspects of the present invention, the whole assembly including spindle head may be position above the base plate as shown in FIG. 5.

In other embodiments not shown, another method for disconnecting a battery from a hardware device 10 circuit if the hardware device 10 is moved after installation utilizes, one or more micro switches are connected between the battery and the hardware device 10 within the circuit. By way of example and limitation, when pressed, these switches connect a power source to the hardware device 10 and when released, the switches disconnect the power source. For example, the switch may comprise a simple switch where the connections are made when the lever is pressed and disconnected when the levers are relieved. During installation of the hardware device 10, the bottom surface of the base 220 of the housing makes contact with the installation surface, causing the micro switch lever to make contact with the installation surface and presses the lever of the switch, thereby connecting the power source to the hardware device 10 circuitry. When the hardware device 10 is removed from the installation surface, the micro switch lever becomes relieved and disconnects the power source from the circuit, thereby removing the power source from the electronic circuit. In some embodiments, multiple switches may be utilized to address the various directions which the hardware device 10 may be removed. In some embodiments, different types of circuit breakers such as a switch rather than lever may be utilized. In some embodiments, activation/deactivation of a switch, level, etc., may reset application paragraph to revert a default state (which may be indicative of tampering) rather than disconnecting the battery source.

According to aspects of the present invention, if a hardware device 10 is removed and not re-installed either for a period of time or indefinitely, tamper detection functionality of the present invention may monitor the time elapsed between communication received from the removed hardware device 10 or since the last received communication from the hardware device 10. For example, a typical user drives the same car every day. For any reason, if a hardware device 10 is not seen by the application executing on the user's mobile device 20 for an indicated period of time (for example, 24 hours), the application may independently, or in conjunction with a remote server/service, transmit, raise, or otherwise indicate a warning to the administrator regarding the lapse in communication with the hardware device 10. In some embodiments, the warning alarm may be a text message, call, email, other appropriate communication methods, or combination thereof. For example, the warning alarm may contain a message such as "Your teenager did not drive his car in the last 24 hours" or some other appropriate message.

Figure 6:
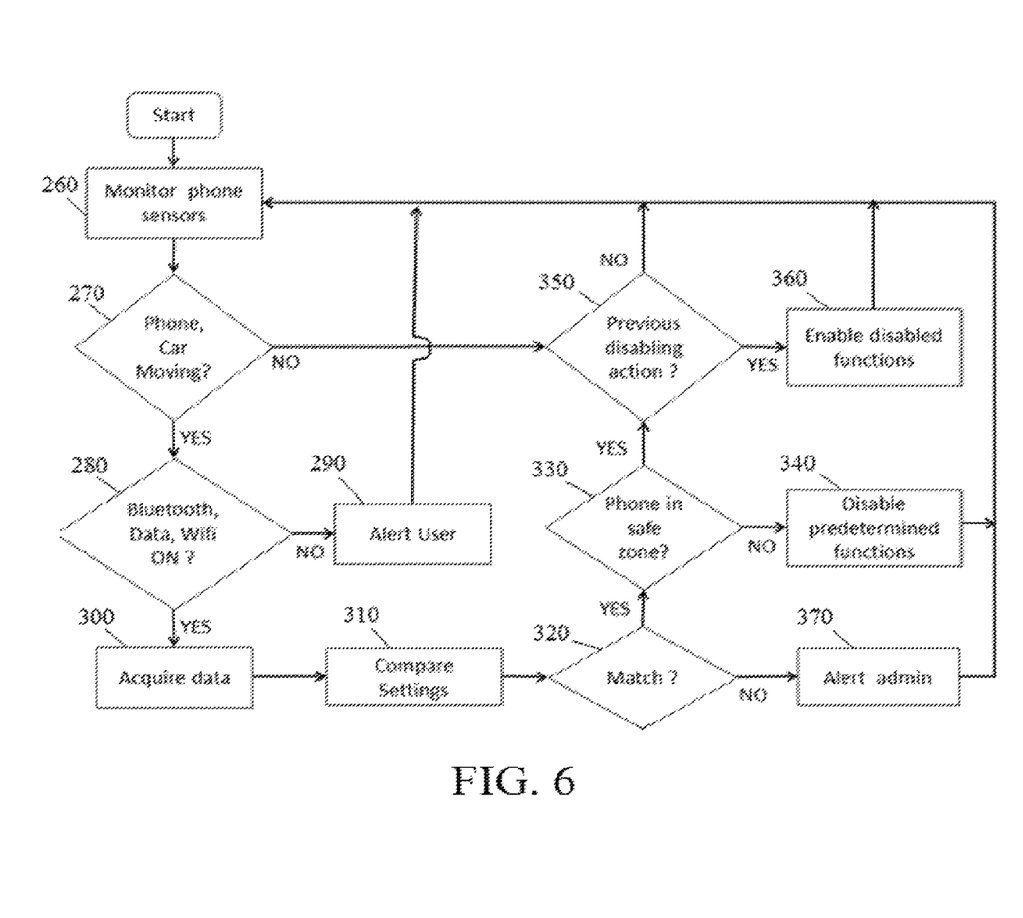
FIG. 6 illustrates an exemplary flow diagram for an exemplary system, according to various aspects described herein.
Figure 7:
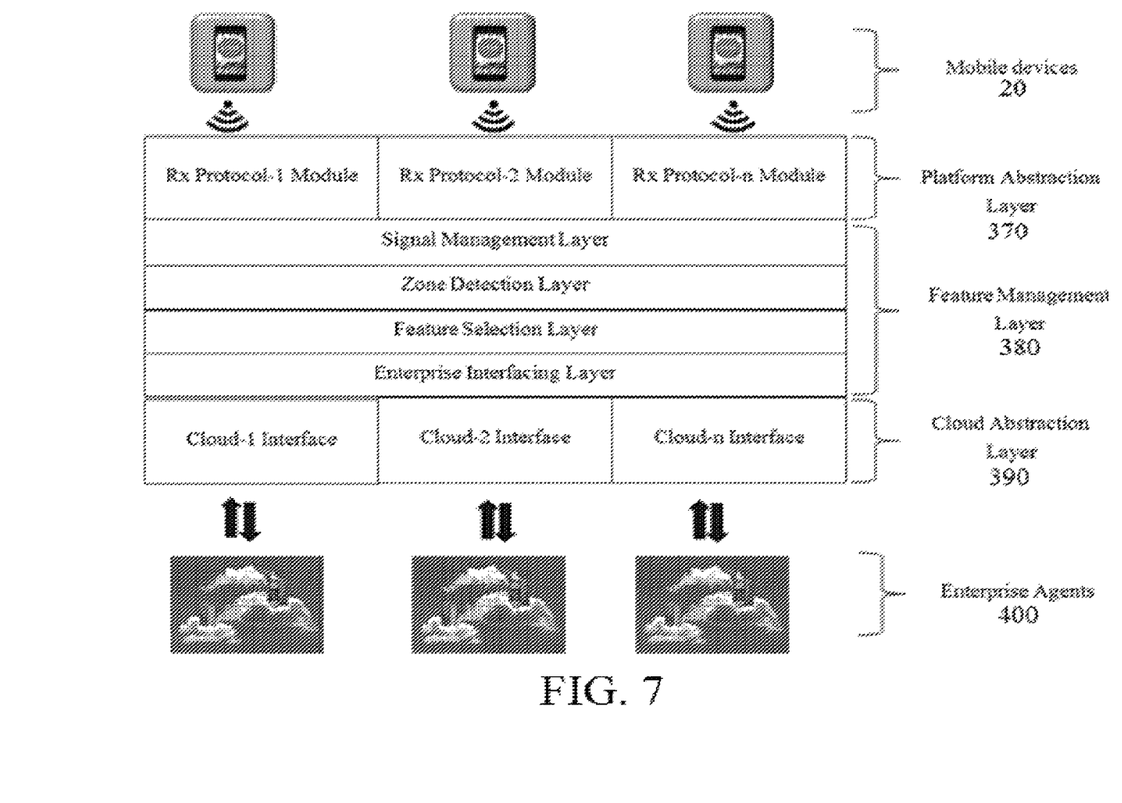
FIG. 7 illustrates an exemplary diagram of an exemplary "smart" transponder, according to various aspects as described herein.

FIG. 6 illustrates am exemplary flow diagram for the system, illustrating exemplary steps performed by the system during operation. In this example, the software application executing on the mobile device 20 may continue monitoring at 260 one or more built-in sensors of the device to, among other things, detect movement of the mobile device 20 as well as movement of the vehicle in which the device is present. In the event movement is detected at 270, the software application may check at 280 to see whether the wireless connections are enabled to communicate with the hardware device and/or backend, either through one or more appropriate communication channels, e.g., BlueTooth, wifi, 3G/4G/LTE data connection, or some combination thereof. If not, the user may be prompted at 290 to enable the appropriate wireless communication channels and/or means. Such notification may be repeated (for example, at a fixed interval of time) until the user enables the appropriate wireless communication channels/means. Once enabled, the application may then acquire data at 300 from the hardware devices and check for tampering at 310 and 320, an example of which is described above. The application may then determine whether the mobile device 20 is located in a "safe" zone or a "non-safe" zone at 330. If so, the software application proceeds at steps 340, 350, and 360 with performing pre-determined actions configured by the administrator, such as disabling texting, calling, social media, etc., enabling applications such as maps or calling/texting pre-determined numbers such as parents, etc. In some embodiments, these pre-determined actions may be included in the software application as default actions. In some embodiments, these pre-determined actions may be set by the administrator at the time of installation. This logical sequences are repeated over and over.

According to aspects of present invention, spatial tampering detection is provided by a software application (smart transponder) executing on the mobile device 20. Other executing applications may optionally utilize the smart transponder, such as a "distracted driving" application. In some embodiments, the smart transponder include one or more applications that provide functionality for detecting spatial tampering. One of ordinary skill in the pertinent arts will understand that, in some embodiments, one or more applications may interact to provide this functionality, while in other embodiments, an "integrated" application may include one or more functions, subroutines, etc., that provide the functionality.

Figure 8:
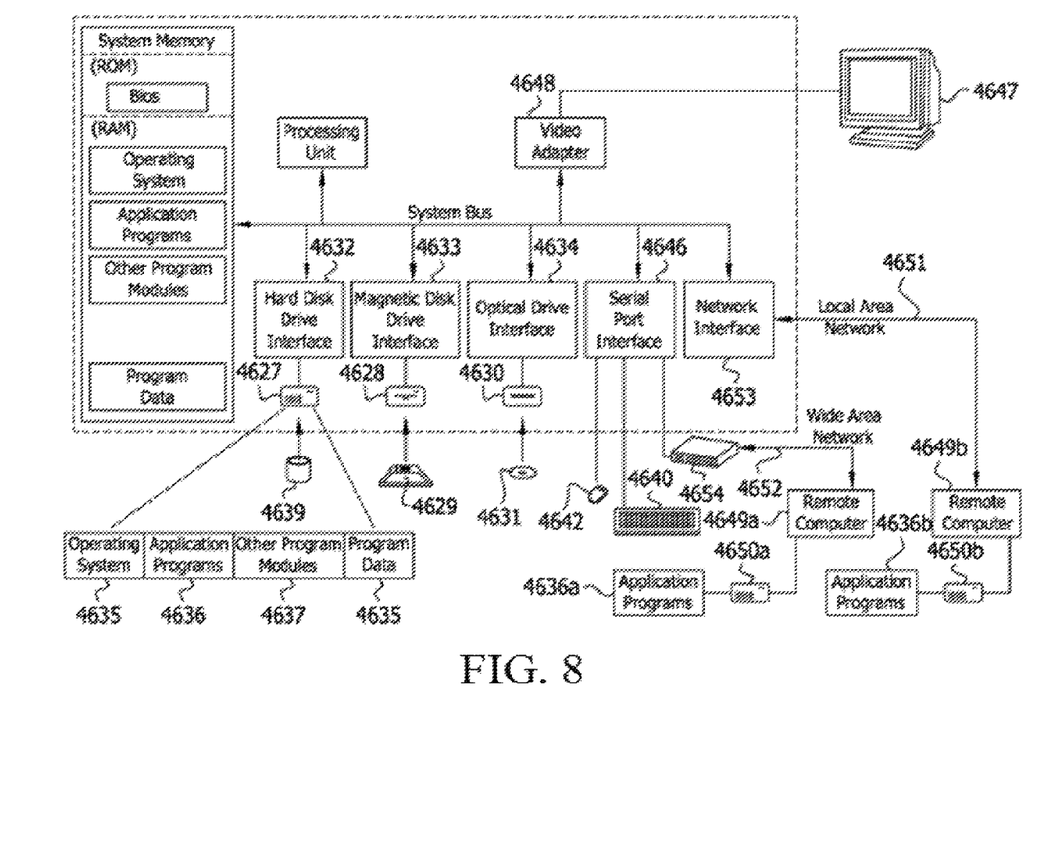
FIG. 8 is a block diagram illustrating an example of a suitable computing system environment in which aspects of the invention may be implemented.

FIG. 8 illustrates exemplary abstraction layers of an exemplary smart transponder system. As illustrated in FIG. 8, a Platform Abstraction Layer (PAL) 370 within the Smart Transponder is utilized to communicate with any passive transmitter (e.g., proximity device). The PAL 370 may permit the monitoring software agent to remain independent of communication protocol utilized by the passive transmitter. The PAL may additionally enable the monitoring software agent and feature management layer 380 to communicate with multiple transmitters simultaneously.

An exemplary Cloud Abstraction Layer (CAL) 390 within the monitoring software agent on mobile device 20 may be utilized to communicate with multiple and diversified enterprise agents 400, as described above. These agents may reside in, but are not limited to, Amazon Web Services or Parse. An enterprise agent may remotely monitor the health and wellness of the monitoring software agent and alert the user if errors or anomalies are detected. A user may be either an owner (responsible party) of the mobile device, a registered party of the system, or some combination thereof. Various alerts may include, but are not limited to, emailing, messaging, push functionality, voice calling or completely disabling the phone. The system may additionally include recommendation functionality within one or more enterprise agents, whereby the recommendation functionality may periodically collect the data from smart transponders and provide information regarding improvements to monitored driving habits. Such improvements may be determined based on the driving habits of specific user, comparative analysis among multiple users, or some combination thereof. As indicated above, one or more enterprise agents executing on the back-end may analyze the driving habits of drivers and categorize them at a specified risk level. Risk Levels includes, but are not limited to, high risk, moderate risk or low risk. Correlated analysis of above risk levels with other factors including, but not limited to, zip code, age, occupation, education etc., may further identify accident-prone drivers. A combination of risk level and correlated analysis may be used in generating the risk profile.

One of ordinary skill in the pertinent arts will recognize that, while various aspects of the present invention are illustrated in FIGS. 1, 2, 3, 4, 5, 6, and 7 as separate elements, one or more of the elements may be combined, merged, omitted, or otherwise modified without departing from the scope of the present invention.

With reference to FIG. 9, an exemplary system for implementing aspects of the invention includes a general purpose computing device in the form of a conventional computer 4320, including a processing unit 4321, a system memory 4322, and a system bus 4323 that couples various system components including the system memory 4322 to the processing unit 4321. The system bus 4323 may be any of several types of bus structures including a memory bus or memory controller, a peripheral bus, and a local bus using any of a variety of bus architectures. The system memory includes read only memory (ROM) 4324 and random access memory (RAM) 4325. A basic input/output system (BIOS) 4326, containing the basic routines that help transfer information between elements within the computer 20, such as during start-up, may be stored in ROM 4324.

The computer 4320 may also include a magnetic hard disk drive 4327 for reading from and writing to a magnetic hard disk 4339, a magnetic disk drive 4328 for reading from or writing to a removable magnetic disk 4329, and an optical disk drive 4330 for reading from or writing to removable optical disk 4331 such as a CD-ROM or other optical media. The magnetic hard disk drive 4327, magnetic disk drive 4328, and optical disk drive 30 are connected to the system bus 4323 by a hard disk drive interface 4332, a magnetic disk drive-interface 33, and an optical drive interface 4334, respectively. The drives and their associated computer-readable media provide nonvolatile storage of computer-executable instructions, data structures, program modules, and other data for the computer 4320. Although the exemplary environment described herein employs a magnetic hard disk 4339, a removable magnetic disk 4329, and a removable optical disk 4331, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 4339, magnetic disk 4329, optical disk 4331, ROM 4324, and/or RAM 4325, including an operating system 4335, one or more application programs 4336, other program modules 4337, and program data 4338. A user may enter commands and information into the computer 4320 through keyboard 4340, pointing device 4342, or other input devices (not shown), such as a microphone, joy stick, game pad, satellite dish, scanner, or the like. These and other input devices are often connected to the processing unit 4321 through a serial port interface 4346 coupled to system bus 4323. Alternatively, the input devices may be connected by other interfaces, such as a parallel port, a game port, or a universal serial bus (USB). A monitor 4347 or another display device is also connected to system bus 4323 via an interface, such as video adapter 4348. In addition to the monitor, personal computers typically include other peripheral output devices (not shown), such as speakers and printers.

The computer 4320 may operate in a networked environment using logical connections to one or more remote computers, such as remote computers 4349 *a* and 4349 *b*. Remote computers 4349 *a* and 4349 *b* may each be another personal computer, a server, a router, a network PC, a peer device or other common network node, and typically include many or all of the elements described above relative to the computer 4320, although only memory storage devices 4350 *a* and 4350 *b* and their associated application programs 36 *a* and 36 *b* have been illustrated in FIG. 11. The logical connections depicted in FIG. 11 include a local area network (LAN) 4351 and a wide area network (WAN) 4352 that are presented here by way of example and not limitation. Such networking environments are commonplace in office-wide or enterprise-wide computer networks, intranets and the Internet.

When used in a LAN networking environment, the computer 4320 is connected to the local network 4351 through a network interface or adapter 4353. When used in a WAN networking environment, the computer 4320 may include a modem 4354, a wireless link, or other means for establishing communications over the wide area network 4352, such as the Internet. The modem 4354, which may be internal or external, is connected to the system bus 4323 via the serial port interface 4346. In a networked environment, program modules depicted relative to the computer 4320, or portions thereof, may be stored in the remote memory storage device. It will be appreciated that the network connections shown are exemplary and other means of establishing communications over wide area network 4352 may be used.

One or more aspects of the invention may be embodied in computer-executable instructions (i.e., software), such as a software object, routine or function (collectively referred to herein as a software) stored in system memory 4324 or non-volatile memory 4335 as application programs 4336, program modules 4337, and/or program data 4338. The software may alternatively be stored remotely, such as on remote computer 4349a and 4349b with remote application programs 4336b. Generally, program modules include routines, programs, objects, components, data structures, etc. that perform particular tasks or implement particular abstract data types when executed by a processor in a computer or other device. The computer executable instructions may be stored on a computer readable medium such as a hard disk 4327, optical disk 4330, solid state memory, RAM 4325, etc. As will be appreciated by one of: kill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either a another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. Some illustrative implementations of a programming interface may also include factoring, redefinition, inline coding, divorce, rewriting, to name a few. There are, however, other ways to implement a programming interface, and, unless expressly excluded, these, too, are intended to be encompassed by the claims set forth at the end of this specification.

Embodiments within the scope of the present invention also include computer-readable media and computer-readable storage media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for selectively manipulating at least one mobile device when the mobile device is present within one or more defined zones within an area, said system comprising:
- A first control device, said first control device transmitting a first signal, said first signal having a decreasing signal strength as distance from the first control device increases;
- one or more profiles stored in a memory, said profiles determining the one or more defined zones based on one or more values, each value corresponding to a particular signal strength of said first signal;

at least one software application executing on the mobile device, said application being configured for accessing said one or more profiles from said memory and receiving, from the mobile device, an indication of said first signal received at the mobile device and a first signal strength of the received first signal, said first control device, and selectively manipulating the mobile device as a function of the first signal strength and said one or more profiles;
- wherein selectively manipulating the mobile device comprises enabling one or more communication features of the mobile device when said first signal strength is indicative of the mobile device being outside of the one or more defined zones and disabling one or more communication features of the mobiles device when said first signal strength is indicative of the mobile device being inside of one or more of the one or more defined zones.

2. The system of claim 1, wherein said system further comprises:
- a second control device transmitting a second signal, said second signal having a decreasing signal strength as distance from the second control device increases;
- a third control device transmitting a third signal, said third signal having a decreasing signal strength as distance from the third control device increases;
- wherein said values of said one or more profiles correspond to a particular combination of signal strengths of said first signal, second signal, and third signal.

3. The system of claim 2, said application being further configured for receiving, from the mobile device, an indication of said second signal received at the mobile device and a second signal strength of the received second signal an indication of said third signal received at the mobile device and a third signal strength of the received third signal, and selectively manipulating the mobile device as a function of the first signal strength, second signal strength, and said one or more profiles.

4. The system of claim 2, said first control device further comprising one or more mechanisms for detecting a first tamper detection event, said second control device comprising one or more mechanisms for detecting a second tamper detection event, and third control device comprising one or more mechanisms for detecting a third tamper detection event.

5. The system of claim 4, said application being further configured for:
- determining when a first tamper detection event occurs and indicating said first tamper detection event;
- determining when a second tamper detection event occurs and indicating said second tamper detection event; and
- determining when a third tamper detection event occurs and indicating said third tamper detection event.

6. The system of claim 1, wherein said first control device includes one or more mechanisms for detecting a first tamper detection event, said first tamper detection event indicating that the first control device has been removed from its initial position.

7. The system of claim 6, said application being further configured for determining when said first tamper detection event occurs and indicating said first tamper detection event.

* * * * *